United States Patent [19]

Arway

[11] 4,234,885
[45] Nov. 18, 1980

[54] REMOTE INK VALVE
[75] Inventor: George W. Arway, River Grove, Ill.
[73] Assignee: A. B. Dick Company, Chicago, Ill.
[21] Appl. No.: 73,843
[22] Filed: Sep. 10, 1979
[51] Int. Cl.³ .................. G01D 15/18; F16L 55/04; B65D 37/00
[52] U.S. Cl. .................. 346/140 R; 138/26; 222/214
[58] Field of Search .......... 346/140 R; 251/5; 138/26, 30, 114; 222/209, 213, 214, 420

[56] References Cited

U.S. PATENT DOCUMENTS

| | | |
|---|---|---|
| 3,083,689 | 4/1963 | Hegener . |
| 3,387,630 | 6/1968 | Routson .................. 251/5 X |
| 3,891,121 | 6/1975 | Stoneburner .................. 222/420 X |
| 3,900,866 | 8/1975 | Bell et al. .................. 346/140 R X |
| 3,946,398 | 3/1976 | Kyser et al. .................. 346/140 R X |
| 3,961,337 | 6/1976 | Jung et al. .................. 346/140 R |
| 4,041,995 | 8/1977 | Columbus .................. 222/209 X |
| 4,095,722 | 6/1978 | Miller .................. 251/5 X |
| 4,106,032 | 8/1978 | Miura et al. .................. 346/140 R |

FOREIGN PATENT DOCUMENTS 824365  11/1959  United Kingdom .................. 251/5

Primary Examiner—George H. Miller, Jr.
Attorney, Agent, or Firm—Peter S. Lucyshyn

[57] ABSTRACT

A system for controlling the flow of pressurized liquid to a head, for example the print-head of an ink jet printing system, through an elastic conduit and including an outer conduit to form a pressurizable jacket surrounding the inner conduit extending between the head and a remotely located liquid flow control valve, the jacket being depressurized by operation of a valve utilizing a controller simultaneously with closure or shut-off of the liquid flow control valve to prevent dribbling or drooling of liquid at the head immediately following shut-off.

6 Claims, 1 Drawing Figure

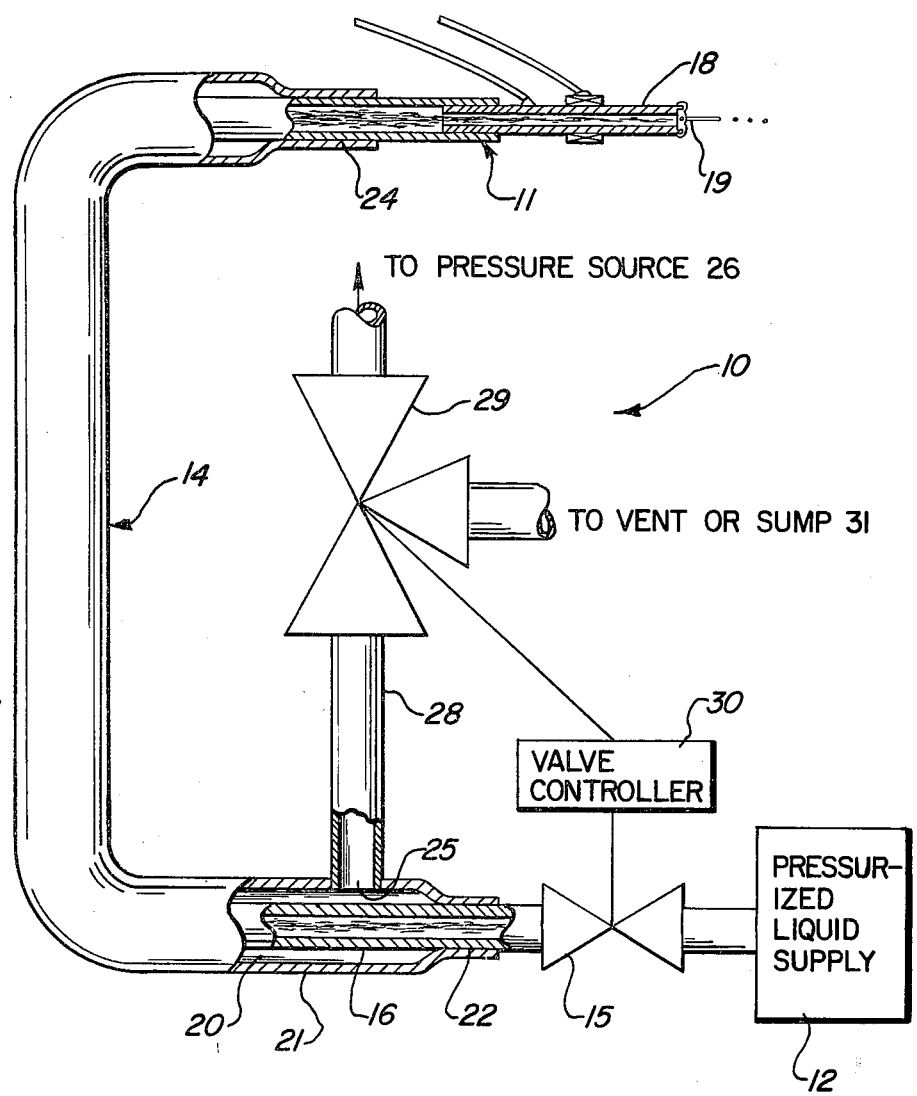

REMOTE INK VALVE

BACKGROUND OF THE INVENTION

This invention relates to a system for delivering pressurized liquid to a head, and more particularly to such a system which permits fast and positive termination of liquid flow at the head while using a valve that is located remotely with respect to the head. Ink jet printing systems, as one exemplary use of the invention, have utilized print-heads having one or more orifices for expelling marking material under pressure toward a medium and marking the latter. These systems are exemplified by the devices disclosed in Sweet U.S. Pat. No. 3,596,275 assigned to the assignee of the present application, A. B. Dick Company, as well as by the devices disclosed in patents owned by others including Hertz U.S. Pat. No. 3,416,153. It is desirable in ink jet printing systems which use pressure to expel a stream or train of droplets to eliminate the drooling that occurs upon shutdown of the system. One approach used to do that includes locating a control valve closely adjacent to the print-head. The valve ordinarily must be of special design to meet the space and configuration requirements necessary for mounting it closely to the print-head. It has been found that the drooling at the print-head is caused essentially by the contraction of the elastic conduit between the print-head and the remotely located shut-off valve. An elastic conduit is ordinarily used to facilitate the positioning and movement of the print-head.

SUMMARY OF THE INVENTION

The present invention involves means for restricting expansion and subsequent contraction of the flexible conduit between the control valve and the head to which the conduit conveys pressurized liquid, so that upon closure of the valve the liquid stops flowing immediately at the head and does not drool. To this end, the system is operated so that the conduit is not in an expanded or stretched state when the remotely located valve is operated to terminate flow of liquid. Accordingly, there is no pressure on the liquid in the conduit downstream from the control valve after the valve is actuated to the closed position. That assures termination of the flow of liquid at the head substantially simultaneously with closure of the valve even though the latter may be located some distance from the head. The present invention eliminates the need to make the valve a part of the head assembly, thereby allowing use of a standard valve and also reducing the overall size and operational restrictions on the head.

The exemplary system practicing the invention includes a first conduit made of elastic material which conveys marking fluid or ink from a source of pressurized liquid to a print-head. A control valve is provided in the conduit to turn-on or turn-off the ink flow in the conduit and thereby to the print-head. A second conduit is provided which is coaxial with the first conduit and which extends between the control valve and the print-head. The second conduit is connected to the first conduit, preferably at its opposite ends, to form a jacket extending over their common lengths which can be pressurized. An opening is provided in the second conduit to permit connection of a source of pressure through another control valve to the jacket, first, to apply a pressure substantially equal to the pressure inside the first conduit and secondly to relieve the pressure on the outside of the first conduit as pressure is removed from the liquid inside the conduit to shutdown the system.

Accordingly, by actuating the two control valves to their respective shut-off positions simultaneously the walls of the first conduit do not contract because substantially equal pressures are maintained on the outside of the conduit and on the inside of the conduit. Thus, when the respective control valves are operated, the first one to stop flow of ink in the first conduit and the other to relieve the pressure applied to the outside of the first conduit, all the pressure is eliminated on the ink between the valve and the head and the flow of liquid at the print-head is stopped simultaneously with operation of the valves.

DESCRIPTION OF THE DRAWINGS

The one FIGURE is a diagramatic representation of a portion of a drop writing system embodying the present invention showing portions of a first and second conduit in section.

DESCRIPTION OF THE PREFERRED EMBODIMENT

Turning to the drawings, illustrated is an ink supply portion 10 of an exemplary drop writing system. Marking material or ink is supplied to a print-head 11 for projection, as exemplarily shown in droplet form, toward a record medium (not shown). A source of pressurized liquid 12 is connected to the print-head 11 via a conduit assembly 14. The latter includes an inline connection of a control valve 15, for example a commonly available solenoid type, a flexible conduit 16 made of elastic material, for example Cobothane (trademark of Cobon Plastics Co.), and an ink jet nozzle 18 of the type described in Keur U.S. Pat. No. 3,972,474 assigned to A. B. Dick Company having an orifice 19. To mark the surface, the liquid may be an ink or marking material of the type commonly used in ink jet printing devices, for example, and the liquid is introduced from the source 12 under pressure to the head 11 by actuation of the valve 15 to an open position.

In accordance with the present invention, the conduit 16 carrying liquid under pressure to the head 11 is maintained in a virtually stable state, neither stretching nor contracting, over substantially its entire length between the valve 15 and the head 11 so that upon shut-off of the system liquid does not drool from the head. In the present instance, a pressurizable zone or jacket 20 is formed by providing a second conduit 21 which is coaxial with, and surrounds the first conduit 16. The second conduit 21 is of greater diameter than the first conduit 16 so that a space exists between them. The conduit 21 is connected by a sealed joint 22 to the first conduit 16 at the one end adjacent to the valve 15, and it is similarly connected by a sealed joint 24 to the conduit 16 at the other end adjacent to head 11.

To pressurize the zone 20 surrounding the first conduit 16 to substantially prevent its expansion, in the present instance the second conduit 21 is provided with an opening 25 for permitting connection of a pressure source 26 thereto through a conduit 28 and a three-way valve 29. The valve 29 is operated by a controller 30 which also operates the valve 15 to assure that the pressures inside and outside of the liquid conveying conduit 16 are equalized. To relieve the pressure within the jacket 20 on shut-down, the valve 29 is provided with a vent 31 which can be directed to the atmosphere if air is used as the pressurizing fluid or to a suitable sump if a liquid, for example ink, is used as the pressurizing medium. The pressure source 26 and the pressurized liquid supply 12 may be one and the same, using suitable connections of the kind known to those skilled in the art. In one instance, the pressure source 26 was pneumatic and at a level of 60 psi to equalize the pressure which was applied to the ink within the conduit 16 while the system was operational as an ink jet printer.

Because, as has been described above, the pressure on the outside of the conduit 16 is maintained substantially equal to the pressure on the inside of the conduit 16, pressure on the ink in the conduit 16 between the valve 15 and the head 11 is relieved immediately upon closure of valve 15. Commonly, in ink jet printing systems the conduit which conveys the liquid is permitted to expand in a normal manner when the system is pressurized; therefore, when valve 15 is closed, though most of the pressure is removed from the liquid because of the isolation of the pressurized source of liquid, there continues to be applied to the ink a transient decreasing pressure due to contraction of the elastic walls of the conduit 16. That causes the ink to dribble or drool from the nozzle, even though the valve 15 has been closed, and the quantity of such liquid increases with the length of conduit downstream from the valve 15. The escape of liquid from this section of conduit, particularly ink in an ink jet printing system, can cause contamination of the area in the printing environment where stream control structures are located; such structures may comprise, for example, charging rings and deflection plates of an ink jet printing system. In addition, dribbled liquid can accumulate about the orifice 19 and eventually cause erratic operation of the printing system. One ink jet printing system, using the present invention, was able to operate without liquid drooling at the print-head though twenty-five feet of conduit was employed to connect the print-head 11 and the remotely positioned valve 15.

Though a coaxial conduit structure and a pair of simultaneously operated valves have been shown for equalizing the pressure inside and outside the first conduit in a manner to prevent uncontrolled flow of liquid from the head orifice on shut-off, other equivalent structures understandable to those skilled in the art may be used and these are contemplated as within the scope of the present invention.

While I have described my invention in connection with one specific embodiment, it is understood that this is by way of illustration and not by way of limitation and the scope of my invention is to be defined by the appended claims which should be construed as broadly as the prior art will permit.

What I claim is:

1. In a liquid flow system having a head which is supplied from a source with pressurized liquid that is expelled by the head, the combination comprising:
   a first conduit of elastic material connecting the liquid source with the head for conveying liquid thereto;
   first means connected to said first conduit for controlling the flow of liquid conveyed through said first conduit to be expelled from the head;
   a second conduit extending between the head and said valve and surrounding said first conduit for providing a pressurizable jacket about said first conduit, and
   second means connected to said jacket for controlling the pressure applied to said first conduit to prevent the expansion thereof, said flow of liquid from said head being terminated substantially immediately upon operation of said first and second means for terminating the flow of liquid in said first conduit and for relieving the pressure in said jacket.

2. In a liquid flow system having a head which is supplied from a source with liquid under pressure that is expelled by the head, the combination comprising:
   a first conduit of elastic material connecting the liquid source with the head for conveying liquid thereto;
   a valve operable to control flow of liquid in said first conduit;
   a second conduit extending between the head and said valve and surrounding said first conduit for providing a pressurizable jacket about said first conduit, and
   means connected to said jacket for controlling the application of pressure to said first conduit for substantially preventing the expansion and contraction thereof.

3. In an ink jet printing system having a print-head which is supplied from a source with liquid marking fluid under pressure, which marking fluid is expelled through an orifice in the head to mark a recording surface, the combination comprising:
   a first conduit of elastic material connecting the liquid source with the print-head for conveying liquid thereto;
   a valve operable to control flow of liquid in said first conduit;
   a second conduit extending between the print-head and said valve and surrounding said first conduit for providing a pressurizable jacket about said first conduit, and
   means connected to said jacket for controlling the application of pressure to said first conduit to restrict the expansion and contraction thereof and thereby substantially preventing drooling of marking fluid from the orifice upon termination of liquid flow in said first conduit in response to operation of said valve.

4. The combination of claim 3 including a controller coupled to said valve and said pressure controlling means for simultaneously terminating ink flow in the first conduit means and relieving the pressure in said jacket.

5. The combination of claim 4 wherein said means connected to said jacket includes a three-way valve.

6. The combination of claim 5, said means connected to said jacket further including a sump, said three-way valve being operable to selectively control flow of fluid from the source of liquid into the second conduit and from the second conduit into the sump, said controller operable for simultaneously terminating ink flow in the first conduit and opening the three-way valve from the second conduit to said sump.

* * * * *